JOHN M. BRUNER.
Improvement in Musical Transposing-Boards.
No. 115,428. Patented May 30, 1871.
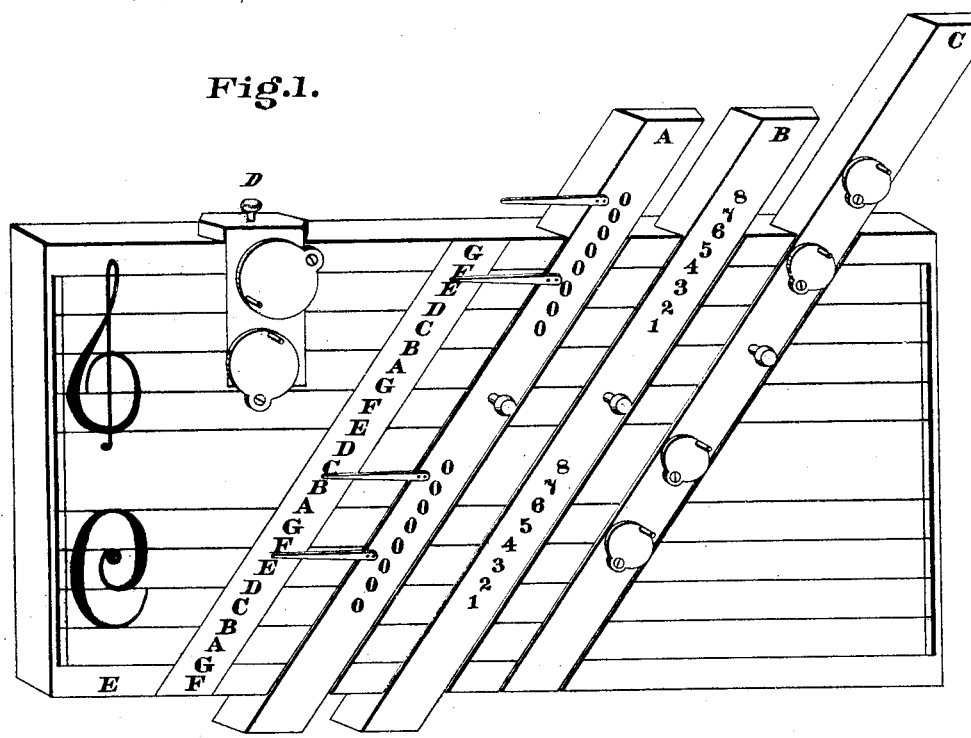
Fig.1.
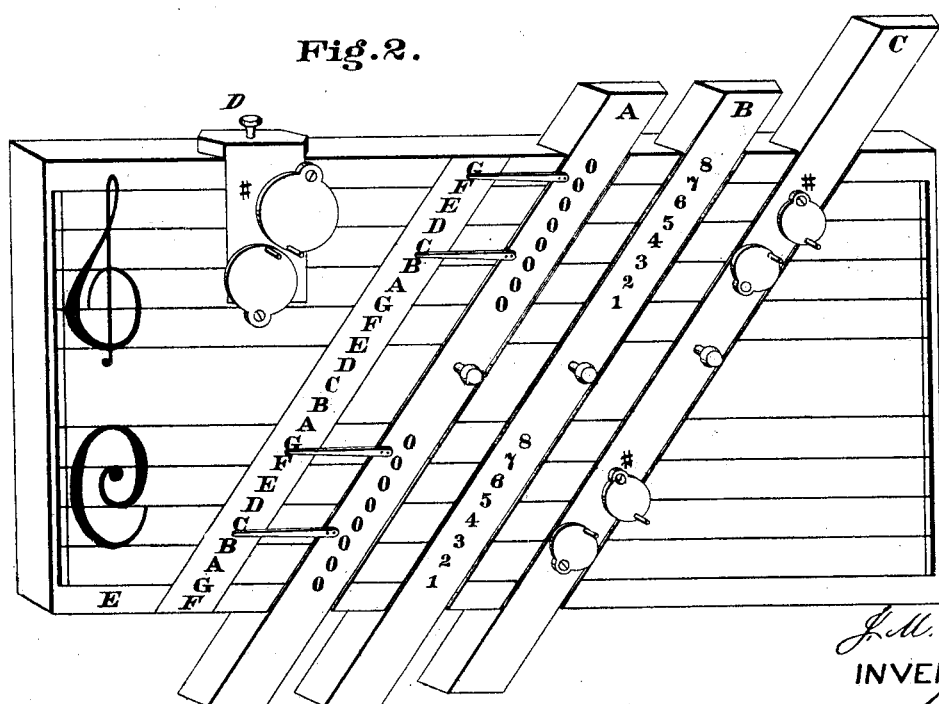
Fig.2.
Fig.3.
Fig.4.
Fig.5.
ATTEST.
Jas. H. Layman.
John Kilohr.
J. M. Bruner
INVENTOR.
By Knight Bros.
(Attys.)

115,428

UNITED STATES PATENT OFFICE.

JOHN M. BRUNER, OF ROANOKE, OHIO.

IMPROVEMENT IN MUSICAL TRANSPOSING-BOARDS.

Specification forming part of Letters Patent No. 115,428, dated May 30, 1871.

I, JOHN M. BRUNER, of Roanoke, Putnam county, Ohio, have invented a new and useful Transposing-Board for the use of teachers of music, of which the following is a specification:

Nature and Objects of the Invention.

My invention relates to a device for assisting instructors in teaching that part of elementary music which consists in the different transpositions of the musical scale in such a manner as to present the different writings of the scale upon the staff at once, clearly and distinctly to the pupil, and with little trouble to the preceptor.

General Description with Reference to the Drawing.

Figure 1 is a perspective view of an instrument embodying my invention set to the natural scale. Fig. 2 represents the same set to the key of G, signature F sharp. Fig. 3 shows the slide C detached and its signatures uncovered. Figs. 4 and 5 show the slide D on the side containing the sharps, and also on that containing the flats.

Upon an oblong slab of wood, or plate of metal, or other material, E, forming the body of my device, are painted two musical staffs, the upper one having the treble cleff and the lower one having the bass cleff, and each line and space being designated by its proper letter, arranged in oblique series across the entire width of the two staves. Three trapezoidal or dovetailed grooves which traverse this plate obliquely—that is to say, parallel to the line of letters—contain as many slides, A B C, of which the slide A has inscribed upon its face two octaves of semibreves, or other simple note characters set at the proper intervals, corresponding to the lines and spaces of the staves. The slide B has inscribed upon its face the numerals corresponding to those octaves. The slide C has opposite each staff a sharp and a flat in their proper positions. A fourth slide, D, at right angles to the upper staff, of which it crosses only the upper two lines, has, upon one side, four sharps, and on the other side four flats, in the usual manner and position of writing the signatures of the respective keys. Movable covers, pivoted or otherwise attached to the slides C and D, enable any one or more of the signatures to be concealed, as desired. The slide D is taken out and reversed, according as sharps or flats are wanted. Small knobs or handles near the midlength of the slides enable their adjustment to any desired position. The slide A has two pairs of pointers, which, when the parts are in position for indicating the natural key, point to the half-intervals between E and F, and between B and C, respectively, as shown in Fig. 1.

Operation.

The instrument, in Fig. 1, is set to show the natural scale or key of C, and the lowest and highest note of the octave, 1 and 8, correspond with the letters C upon the lettered bar, while the indicators point to the half-intervals between B and C and between E and F. To transpose to the key of G, one sharp, the slide A is moved down until its lowest note is opposite G, and the slide B, bearing the numerals, is moved to correspond in position. The indicators now show a half-interval between B and C, as in the natural scale, and call for another half-interval below G, thus indicating to the student the necessity of sharpening F, and the signature of this key is given by uncovering the sharp upon the slide D in the line F. To shift the scale to the key of D, signature two sharps, move slide A up four intervals so as to bring its lowest note opposite to D and expose the second sharp on the slide D. A similar manipulation will show each transposition of the scale by sharps. To transpose by flats depress the slide A until its lowest note is opposite the letter F; the indicators show the half-interval as being between A and B, indicating the necessity of flattening B so as to bring in the proper diatonic intervals. This gives the scale corresponding to the signature of B flat, that key requiring a flat to make the correct interval. In like manner the correct signature and position of any key may be formed. The slide B enables the teacher to show the position of the scale of numerals in each transposition. The numerals are placed on a separate slide so as to enable the teacher to show that the key-note of the diatonic scale is moved from 1 up to 5, or from 8 down to 5, by sharps, and from 1 up to 4, or from 8 down to 4, by flats. The side C is used to sharp or flat any letter or note on the staff by uncovering the proper signature and shifting the slide up or down, as the case may be. This cannot be done with the slide D because the sharps and flats on it are only to show the signature of the key. The slide C may also be used to explain the minor and chromatic scales by placing a flat or a sharp on any required note so as to make half-intervals where there are whole intervals.

The names of the notes—do, re, mi, fa, sol, la, si—may be used if desired; but it is believed to be unnecessary, as they must be learned before commencing the transposition of the scale.

By the use of the slides the teacher can show the different keys and the different positions of the scale upon the staff in a few minutes without making or rubbing out any notes or figures.

The general object of the device is to concentrate in one view the whole subject of the transposition of the scale, and to simplify and bring it within the comprehension of the pupil.

I am aware that boards have been contrived with scales and slides for demonstrating and transposing musical notes—this, therefore, I do not claim; but I do claim—

1. The combined arrangement of the lettered scale, the several slides A B C, and the pointers, as and for the purposes herein specified.

2. The combination of the musical staves, lettered scale, slides A B C, pointers, and reversible slide D, marked on one side for flats and on the other for sharps, and provided with shutters for masking any desired number of the said signature marks.

In testimony of which invention I hereunto set my hand.

JOHN M. BRUNER.

Witnesses:
GEO. H. KNIGHT,
THOS. J. WERNER.